Nov. 17, 1931.  G. FRIEDL, JR., ET AL  1,832,293
PROTECTIVE DEVICE
Filed June 27, 1929
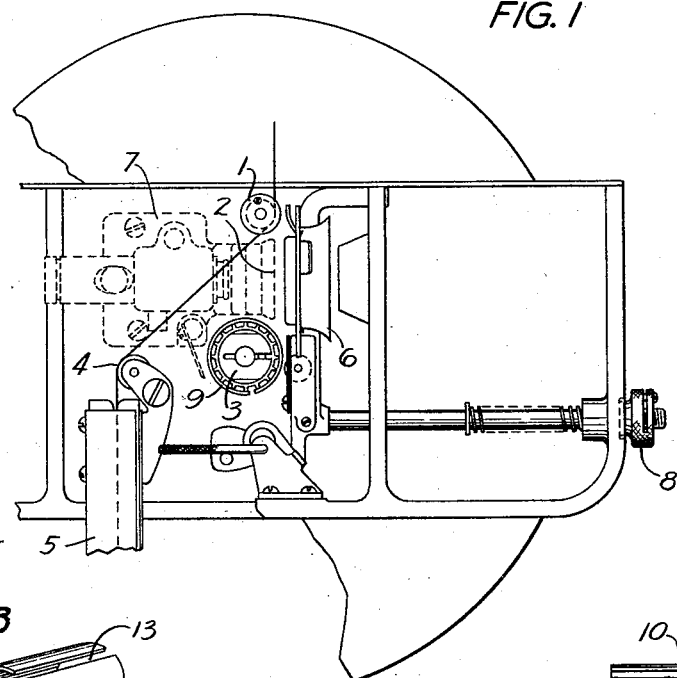
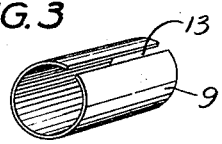
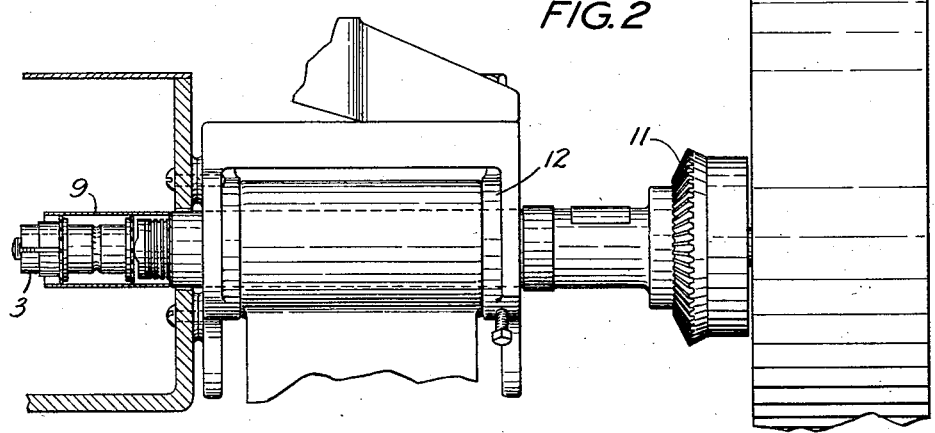
INVENTORS: G. FRIEDL, Jr.
A. GASTONGUAY
BY
G. H. Heydt
ATTORNEY Patented Nov. 17, 1931

1,832,293

UNITED STATES PATENT OFFICE

GEORGE FRIEDL, JR., OF WHITESTONE, AND ANTONIO GASTONGUAY, OF NEW YORK, N. Y.; SAID FRIEDL, JR., ASSIGNOR TO ELECTRICAL RESEARCH PRODUCTS, INC., OF NEW YORK, N. Y., A CORPORATION OF DELAWARE, AND SAID GASTONGUAY ASSIGNOR TO BELL TELEPHONE LABORATORIES, INCORPORATED, OF NEW YORK, N. Y., A CORPORATION OF NEW YORK

PROTECTIVE DEVICE

Application filed June 27, 1929. Serial No. 374,256.

This invention relates to protective devices and more particularly to protective devices used in connection with equipment for the projection of sound pictures.

A feature of the invention is the provision of a protective device for a driving sprocket which will at desired times, prevent the sprocket from engaging with the film and thus damaging the film.

A further feature of the invention is found in the adaptability of the device for preventing injury to the driving sprocket during the assembly of the projector.

In the sound reproducing unit of a sound picture projector using photographic sound records of the film type, the film is usually drawn past the reproducing point by a sprocket and for correct reproduction of the sound the film must be drawn past the reproducing point at uniform speed. Uniform speed may be secured by driving the sprocket by means of a mechanical filter which will transmit a uniform rotation to the sprocket. This mechanical filter will usually consist of a heavy flywheel rotating the shaft through some elastic connection, the vibrations being absorbed by a damping device. If the mechanical filter should get out of adjustment, the resulting irregular rotation of the drive sprocket will not only prevent the satisfactory reproduction of sound but may also prevent the use of the projector for showing moving pictures without sound.

As the elements of the mechanical filter must cooperate to produce the desired filtering action a common method of manufacture is to assemble the component parts together to form a unitary assembly. In mounting this assembly on the reproducer unit, the sprocket is passed through an opening in the side of the unit, and due to the weight of the elements, difficulty is found in preventing the sprocket coming in contact with the sides of the opening and thus injuring the sprocket.

In accordance with the present invention, a shield is provided which may be slipped over the sprocket during the assembly of the filter on the reproducing unit and thus protect the sprocket for accidental injury. Also, if due to a derangement of the filter, the rotation of the sprocket is no longer uniform, the shield may be slipped over the sprocket, allowing the sprocket to continue rotating but preventing the film from engaging with the sprocket. Thus the irregular movement of the sprocket is not communicated to the film and the projector may be used for silent pictures or for sound pictures without sound accompaniment. In the preferred form of this invention, the shield is a metallic cylinder having a longitudinal slit. The shield fits snugly over the sprocket and is retained by the resilience of the metal.

In the drawings

Fig. 1 shows a partial side view of the sound reproducing unit with the protective device in place.

Fig. 2 shows the sprocket driving means assembled through the wall of the sound reproducing unit.

Fig. 3 shows the protective device.

Referring to Fig. 1, in the normal operation of the sound reproducing unit, the film passes round a guide roller 1, past the sound aperture plate 2, around the sprocket 3, over the guide roller 4 and through the film chute 5 to the take up reel (not shown). The film gate 6 holds the film firmly yet resiliently against the sound aperture plate 2.

If, due to some derangement of the drive, the sprocket 3 rotates irregularly the reproduced sound will be unsatisfactory. The sound may, of course, be shut off in any convenient manner, as for example, by turning off the exciting lamp, but the irregular rotation of the sprocket 3 may so affect the feed of the film that the projector cannot display even silent pictures satisfactorily. For example, if the sprocket 3 stops turning entirely the film will not be fed to the take up reel. Hence, it is necessary to entirely remove the film from the control of the sprocket 3.

When the film feed is found to be irregular, the optical system 7, including the sound aperture plate 2 is removed from the unit. The film gate 6 is drawn back to the right by the rod 8 and held back out of the path of the film. The film is then threaded directly from the guide roller 1 to the guide roller 4 and thence to the take up reel.

The pulsations transmitted to the film by the intermittent movement in the projector head will cause the portion of film between the guide rollers 1 and 4 to vibrate and this vibration may build up to an amplitude which will cause the film to strike against the sprocket 3. If the sprocket holes in the film should engage the teeth on the sprocket 3, the film will probaby be damaged and may be torn in two, causing a delay in the presentation. To eliminate this trouble a resilient metal sleeve 9 is slipped over the sprocket 3 preventing the film from engaging with the teeth of the sprocket and being damaged.

In the normal operation of the sound reproducing unit, it is essential that the film be drawn past the sound aperture at a constant speed, so a special drive is used to give the sprocket 3 a constant rotational speed. To secure the required constancy of rotation, the sprocket 3 is mounted on a shaft attached to the heavy flywheel 10. The gear 11 is loosely mounted on the shaft and driven in any suitable manner. The rotation of the gear 11 is transmitted through a series of damped springs (not shown) to the flywheel 10. The shaft, flywheel 10 and sprocket 3 are supported by the bearing 12 suitably journalled in the wall of the sound reproducing unit. The bearing 12 is made of unusual length to provide a firm support for the shaft.

For convenience in manufacture, the sprocket 3, shaft, flywheel 10, gear 11 and the associated damping means are made up as a unitary assembly. To mount this assembly on the unit, it is necessary to raise and hold the comparatively heavy flywheel 10 while the sprocket 3 is passed through the bearing 12. Due to the length of the bearing 12 there is a danger that the sprocket 3 will strike the inside of the bearing 12, damaging the teeth of the sprocket 3 and injuring the inside of the bearing.

In accordance with this invention, a sleeve 9, as shown in Fig. 3, is slipped over the sprocket 3 before the unitary assembly is mounted on the unit. The teeth of the sprocket 3 are thus guarded from injury and prevented from injuring the inside of the bearing 10.

The sleeve 9 is split longitudinally from end to end by the slit 13, and the inside diameter of the sleeve 9 is made slightly smaller than the outside diameter of the sprocket 3. When the sleeve 9 is slipped over the sprocket 3 the sleeve is expanded enlarging the slit 13 and holding the sleeve 9 on the sprocket 3 by the resilience of the material.

What is claimed is:

1. In a film feeding device, a unitary drive comprising a shaft, a flywheel affixed near one end of said shaft, and a sprocket affixed to the other end of said shaft, a bearing mounted in said device and adapted to substantially encircle a portion of said shaft and a protective device removably mounted on said sprocket and comprising a metallic cylinder having an external diameter less than the internal diameter of said bearing and protecting all of the teeth of said sprocket from engagement with said bearing during the insertion of said drive in said bearing.

2. In a film feeding mechanism, a film sprocket, and a protective device for preventing the engagement of a film with said sprocket during the passage of the film through said mechanism, said device comprising a resilient metallic cylinder substantially encircling said sprocket and frictionally retained thereon.

In witness whereof, I hereunto subscribe my name this 25th day of June, 1929.

GEORGE FRIEDL, JR.

In witness whereof, I hereunto subscribe my name this 26th day of June, 1929.

ANTONIO GASTONGUAY.